June 2, 1942.     J. G. FRANCIS     2,284,955
LIGHTING FIXTURE
Filed Aug. 19, 1939
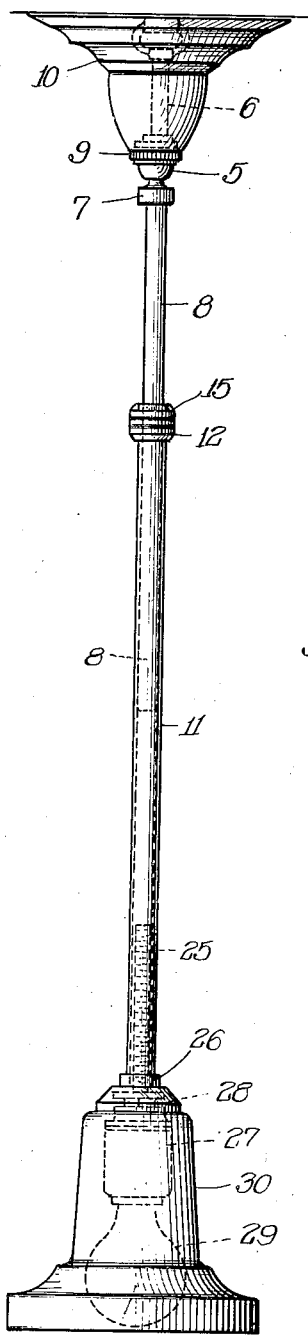
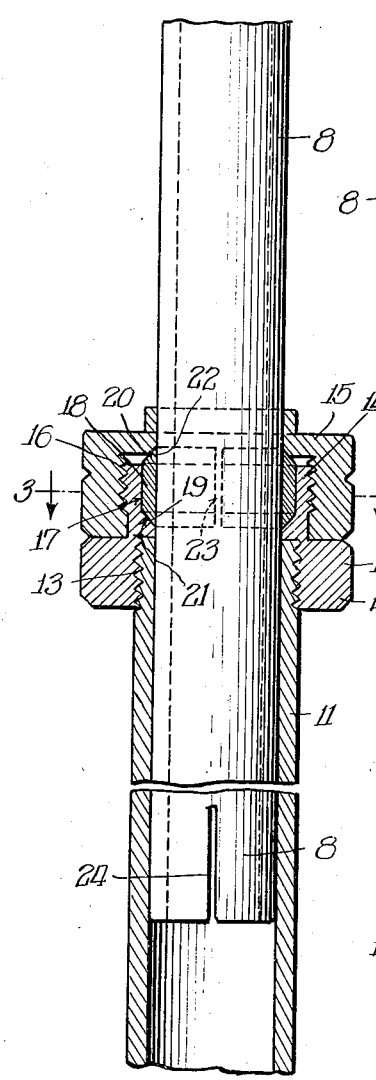
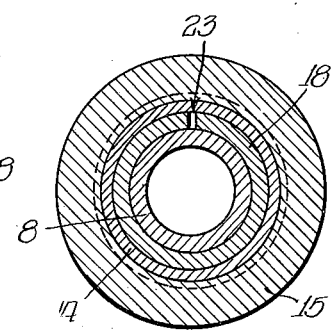
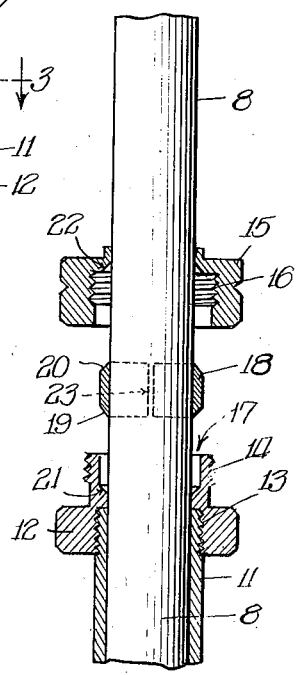
INVENTOR.
John G. Francis,
BY John A. Marzall
ATTORNEY.

Patented June 2, 1942

2,284,955

UNITED STATES PATENT OFFICE 2,284,955

LIGHTING FIXTURE

John G. Francis, Chicago, Ill., assignor to Chamberlain, Inc., Chicago, Ill., a corporation of Illinois Application August 19, 1939, Serial No. 290,940

1 Claim. (Cl. 248—337)

This invention relates to lighting fixtures and its primary object is to provide a new and novel fixture having a suspending telescoping rod or arm, there being improved means for locking the telescoping parts in adjusted position.

Another important object of the invention resides in the provision of a telescoping arm or rod comprising at least two telescoping parts adapted for longitudinal adjustment and locked in such adjusted position by the operation of a locking element or nut causing compression or extension of a locking ring co-operating with certain parts of the fixture.

A further object of the invention is the provision of a new and novel telescoping lighting fixture which comprises a particular construction and location of parts arranged and assembled in a predetermined manner to effect proper adjustment of the telescoping parts; which is adaptable for use on ceilings of various heights; which can be readily and quickly applied to the box or device to which the fixture is to be suspended; which is constructed and arranged to support effectively and adjustably the shade holder; and which is compact so as to be capable of being conveniently and efficiently packed in a relatively small container.

Numerous other objects and advantages will be apparent throughout the progress of the following specification.

The accompanying drawing illustrates a selected embodiment of the invention, and the views therein are as follows:

Fig. 1 is an elevational view of the improved lighting fixture and embodying the invention;

Fig. 2 is a detail longitudinal view showing the construction and arrangement of the telescoping parts in locked position;

Fig. 3 is a detail transverse sectional view on the line 3—3 of Fig. 2; and

Fig. 4 is a view similar to Fig. 2 but showing the parts in unlocked position.

The lighting fixture herein shown for the purpose of illustrating the invention comprises a fitting 5 which has an internal threaded opening into which a hickey 6 is threadedly received for supporting the fixture to the outlet box or receptacle. The fitting 5 is provided with an inside socket member (not shown) to receive a ball formed on a co-operating part or fitting 7 on the rod 8. The fittings 5 and 7 thereby comprise ball and socket fittings so as to insure proper suspension from the ceiling. The fitting 5 includes the part 7 which is rigid on the rod 8. The fitting 5 also has a ring nut 9 threadedly engaging the periphery of the member 5 near its upper end so as to lock the canopy 10 in proper position against the ceiling.

The hollow rod 8 is telescopingly received in a larger hollow rod 11 which has a fitting 12 in the form of a nut fixed to its upper end. This fitting or nut 12 may be fastened to the rod 11 in any convenient manner, such as by threadedly engaging the thread end as indicated at 13, Figs. 2 and 4. The fitting 12 is also provided with an exteriorly threaded end or nipple portion or part 14 which has threaded engagement with a second fitting or nut 15 loosely slidable on the rod 8, the nut member 15 being interiorly threaded as at 16 to permit such threaded engagement with the nipple part 14. The nipple portion 14 of the member 12 is provided with an internal cavity 17 into which an expansible locking ring 18 is adapted to be received. The ends of this ring 18 are provided with peripheral beveled or cam surfaces 19 and 20 which co-operate with opposed beveled or cam surfaces 21 and 22 formed on the inner walls of the fittings or nuts 12 and 15, respectively. The ring 18 is split at 23 so as to be capable of contraction or expansion. The rod 8 telescopes in the rod 11 and permits longitudinal adjustment. The rods 8 and 11 are locked in adjusted position by means of the locking ring 18 being compressed by the tightening engagement of the nut member 15 on the fitting 12. When the nut or fitting member 15 is tightened on the nipple portion 14 of the member 12 the ring 18 is squeezed tightly around the rod 8. This squeezing action is accomplished, or at least advanced, by the bevels 19 and 20 on the ring pressing against the bevel surfaces 21 and 22 on the parts 12 and 15. This squeezing action compresses the ring 18, forcing the ring to hug tightly the rod 8, and inasmuch as the ring is held between the members 15 and 12, the rods 8 and 11 are locked securely together. When the telescoping rod, comprising the two separated rod members 8 and 11, is to be adjusted, the nut 15 is loosened on the nipple 14 whereupon the ring 18 expands and becomes loose on the rod 8 to allow for telescoping adjustment. To lock the parts in adjusted position again the nut 15 is merely tightened.

The lower end of the rod 8 is provided with one or more longitudinal slits 24 to spread the bottom of the rod and to prevent it from easily being withdrawn or pulled completely out of its co-operating telescoping part or rod 11.

A threaded stem 25, Fig. 1, threadedly engages a fitting member or sleeve 26. The sleeve 26 is provided with an interiorly threaded portion to receive exterior threads on the end of the rod 11. The sleeve 26 has a central threaded opening to receive the threaded stem 25, whereby the stem can be moved into or out of the rod 11 to effect adjustment of the electric light socket 27 to which the lower end of the threaded member 25 is fastened. The external diameter of the threaded stem 25 is preferably made slightly smaller than the internal diameter of the rod 8 so that when the parts are completely telescoped in collapsed position the threaded stem 25 will be free to extend up into the rod 8. A lock nut 28 threadedly engages the member 25 to lock the parts in adjusted position. A lamp 29 is threadedly received in the lamp socket 27, and a lower canopy or shade holder 30 surrounds the connections at the lower assembly and supports a globe. The lower canopy or globe support 30 fits over the upper portion of the member 26 and bears against the lower part thereof, the member 26 being made in two diameters, as clearly shown in Fig. 1.

The electric connectors leading from the electric receptacle and to the lamp socket are received within the telescoping fixtures and are of a length sufficient to accommodate full extension.

The invention provides a light fitting which is telescoping and therefore permits it to be used on ceilings of different heights, it not being necessary to shorten the rod. The adjustment is effected by merely releasing or loosening the nut or fitting member 15 so as to permit telescoping of the parts 8 and 11. The adjustment is effected by a single nut element. Also, adjustment of the lamp socket may be effected by merely screwing the threaded member 25 into or out of the fitting 26, the fitting 26 being fastened to the rod 11. The fixture is neat and ornamental in appearance, is strong and durable, and can be readily and economically manufactured.

Changes may be made in the form, construction and arrangement of the parts without departing from the spirit of the invention or sacrificing any of its advantages, and the right is hereby reserved to make all such changes as fairly fall within the scope of the following claim.

The invention is hereby claimed as follows:

An extensible lighting fixture comprising a pair of hollow rods adapted to telescope one within the other to provide for adjusting the length of the fixture and effect shortening thereof to facilitate shipping and storage, means for locking the rods in adjusted positions, a sleeve threadedly secured to an end of the outer of said rods, said sleeve having a concentric threaded opening therein, a threaded stem threadably received in said threaded opening and adapted to adjustably extend into the hollow interior of said outer rod, a lamp socket connected to said threaded stem for adjustment therewith relative to said sleeve and the end of said outer rod, said stem and the hollow interior of the inner of said telescoping rods being of a size providing for entry of the stem into the hollow interior of said inner rod when the latter is telescoped a predetermined distance into the outer rod whereby said rods and said stem are telescopically adjustable to a relatively short collapsed length, and means on said sleeve for supporting a canopy.

JOHN G. FRANCIS.